United States Patent
Puri et al.

(10) Patent No.: US 11,440,432 B2
(45) Date of Patent: Sep. 13, 2022

(54) SYSTEM AND METHOD OF PERFORMING A RANGE ESTIMATION FOR HYBRID AND ELECTRIC VEHICLES

(71) Applicant: CUMMINS INC., Columbus, IN (US)

(72) Inventors: Anant Puri, Columbus, IN (US); Kenneth M. Follen, Greenwood, IN (US)

(73) Assignee: CUMMINS INC., Columbus, IN (US)

(*) Notice: Subject to any disclaimer, the term of this patent is extended or adjusted under 35 U.S.C. 154(b) by 138 days.

(21) Appl. No.: 16/125,038

(22) Filed: Sep. 7, 2018

(65) Prior Publication Data
US 2020/0079223 A1    Mar. 12, 2020

(51) Int. Cl.
*B60L 58/13*    (2019.01)
*B60W 20/12*   (2016.01)

(52) U.S. Cl.
CPC ............. *B60L 58/13* (2019.02); *B60W 20/12* (2016.01); *B60L 2260/52* (2013.01); *B60L 2260/54* (2013.01)

(58) Field of Classification Search
CPC .. B60L 58/13; B60L 2260/52; B60L 2260/54; B60L 58/10; B60W 20/12
See application file for complete search history.

(56) References Cited

U.S. PATENT DOCUMENTS

| | | | |
|---|---|---|---|
| 8,406,948 B2* | 3/2013 | Wang | B60L 50/16 701/22 |
| 8,989,999 B2* | 3/2015 | Vicharelli | G01C 21/3469 701/123 |
| 9,079,507 B2* | 7/2015 | Smith | B60L 50/66 |
| 2010/0138142 A1* | 6/2010 | Pease | B60W 50/0097 701/123 |

(Continued)

FOREIGN PATENT DOCUMENTS

WO    WO-2005068245 A1 *    7/2005    ............. B60L 58/13

OTHER PUBLICATIONS

WO-2005068245-A1 translation (Year: 2005).*

(Continued)

*Primary Examiner* — Mahmoud S Ismail
*Assistant Examiner* — Gabriel Anfinrud
(74) *Attorney, Agent, or Firm* — Faegre, Drinker, Biddle & Reath, LLP (57) ABSTRACT

A system is provided for performing an automated range estimation process for an electric vehicle using a processor. Included in the system is a range estimator configured to estimate an initial value of an energy required to travel a unit distance for the electric vehicle. The range estimator generates a first estimation model based on a correlation between a maximum all-electric-range and the energy required to travel a unit distance. Then, the first estimation model is adjusted based on one or more predetermined driving conditions. The maximum all-electric-range of the (Continued)

electric vehicle is updated based on the adjusted first estimation model. An estimated range of the electric vehicle is calculated based on the updated maximum all-electric-range of the electric vehicle and a fraction of total energy capability remaining in the electric vehicle. The estimated range of the electric vehicle is outputted and is used to control the electric vehicle.

22 Claims, 4 Drawing Sheets

(56) References Cited

U.S. PATENT DOCUMENTS

| | | | | |
|---|---|---|---|---|
| 2012/0116606 | A1* | 5/2012 | Ichinokawa | B60K 35/00 |
| | | | | 701/1 |
| 2016/0052505 | A1* | 2/2016 | Zhou | B60W 20/13 |
| | | | | 701/22 |

OTHER PUBLICATIONS

Gong, Qiuming et al., "Customer Data Driven PHEV Refuel Distance Modeling and Estimation," SAE International, Mar. 28, 2017; 7 pages.

\* cited by examiner

SYSTEM AND METHOD OF PERFORMING A RANGE ESTIMATION FOR HYBRID AND ELECTRIC VEHICLES

This invention was made with Government support under DE-EE0007514 awarded by the United States Department of Energy. The Government has certain rights in this invention.

TECHNICAL FIELD

This disclosure relates generally to methods and systems for calculating a driving range for a vehicle, and more particularly to performing a range estimation of hybrid and electric vehicles operating with a rechargeable energy storage supply.

BACKGROUND

Recently, the need to reduce fossil fuel consumption and reduce emissions in various systems, such as generators, automobiles, and other vehicles powered by internal combustion engines is continuing to grow in light of new governmental regulations, customer demand, and in an effort to reduce the operating costs of such systems. In an attempt to address these needs, some efforts have included the use of both an electric motor and an internal combustion engine (ICE), such as, for example, a hybrid electric vehicle (HEV). In some cases, a pure electric vehicle (EV) operated by a battery only has been introduced to address the needs.

Thus, both the hybrid and pure electric vehicles provide an alternative to conventional fuel engine systems for either supplementing or completely replacing the engine systems, such as the ICEs. In one example, an alternative vehicle is known as an extended range electric vehicle (EREV). In the EREV, primary electric drive is achieved with a battery or related rechargeable energy storage system (RESS) that acts as a direct current (DC) voltage source to a motor, generator or transmission that in turn can be used to provide the energy needed to rotate one or more of vehicle's wheels. When the electrical charge from the RESS has been depleted, backup power may come from the ICE to provide auxiliary onboard electrical energy generation.

However, when multiple energy sources (e.g., the battery and ICE) are used to drive the vehicle, it is difficult to estimate a driving range of the vehicle, and inconvenient for a vehicular operator to correlate a driving distance with available battery charge. Conventional methods and systems to perform the driving range estimation are available, but they require detailed information about customer data related to other vehicles and complicated calibrations on such information, thereby making such methods and systems impractical. For example, modeling simulation tools require large amounts of input data to be run correctly. Further, such models also require complicated calculations using sophisticated software.

Accordingly, there are opportunities to develop enhanced driving range estimation systems and methods that can more efficiently perform the driving range estimation for the hybrid electric and pure electric vehicles.

SUMMARY

In one embodiment, a computer-implemented method is provided for performing an automated range estimation process for an electric vehicle using a processor. The method includes estimating, using the processor, an initial value of an energy required to travel a unit distance for the electric vehicle, generating, using the processor, a first estimation model based on a correlation between a maximum all-electric-range and the energy required to travel a unit distance for the electric vehicle, adjusting, using the processor, the first estimation model based on one or more predetermined driving conditions, updating, using the processor, the maximum all-electric-range of the electric vehicle based on the adjusted first estimation model, calculating, using the processor, an estimated range of the electric vehicle based on the updated maximum all-electric-range of the electric vehicle and a fraction of total energy capability remaining in the electric vehicle, and outputting, using the processor, the estimated range of the electric vehicle. The method further includes controlling, using the processor, the electric vehicle using the outputted estimated range.

In one example, the method further includes determining whether the electric vehicle is at least partially powered by an engine. In a variation, determining whether the electric vehicle is at least partially powered by the engine comprises retrieving an initial value of average fuel economy information for the electric vehicle. In a further variation, the method further includes generating a second estimation model based on a correlation between the average fuel economy information and the energy required to travel the unit distance for the electric vehicle. In another variation, the method further includes adjusting the second estimation model based on the one or more predetermined driving conditions. In yet another variation, the method further includes updating the average fuel economy information of the electric vehicle based on the adjusted second estimation model. In still another variation, the method further includes calculating the estimated rage of the electric vehicle based on the updated maximum all-electric-range of the electric vehicle, the fraction of total energy capability remaining in the electric vehicle, the updated average fuel economy information of the electric vehicle, and an amount of fuel remaining in the electric vehicle.

In another example, the method further includes calculating a fuel-based range of the electric vehicle based on the average fuel economy information and an amount of fuel remaining in the electric vehicle, and adding the fuel-based range to the estimated range of the electric vehicle as a total range of the electric vehicle.

In another embodiment, a system is provided for performing an automated range estimation process for an electric vehicle using a processor. The system includes a range estimator configured to estimate an initial value of an energy required to travel a unit distance for the electric vehicle, generate a first estimation model based on a correlation between a maximum all-electric-range and the energy required to travel a unit distance for the electric vehicle, adjust the first estimation model based on one or more predetermined driving conditions, update the maximum all-electric-range of the electric vehicle based on the adjusted first estimation model, calculate an estimated range of the electric vehicle based on the updated maximum all-electric-range of the electric vehicle and a fraction of total energy capability remaining in the electric vehicle, and output the estimated range of the electric vehicle, and control the electric vehicle using the outputted estimated range.

In one example, the range estimator is further configured to determine whether the electric vehicle is at least partially powered by an engine. In a variation, the range estimator is further configured to retrieve an initial value of average fuel economy information for the electric vehicle. In a further variation, the range estimator is further configured to generate a second estimation model based on a correlation between the average fuel economy information and the energy required to travel the unit distance for the electric vehicle. In another variation, the range estimator is further configured to adjust the second estimation model based on the one or more predetermined driving conditions. In yet another variation, the range estimator is further configured to update the average fuel economy information of the electric vehicle based on the adjusted second estimation model. In still another variation, the range estimator is further configured to calculate the estimated rage of the electric vehicle based on the updated maximum all-electric-range of the electric vehicle, the fraction of total energy capability remaining in the electric vehicle, the updated average fuel economy information of the electric vehicle, and an amount of fuel remaining in the electric vehicle.

In another example, the range estimator is further configured to calculate a fuel-based range of the electric vehicle based on the average fuel economy information and an amount of fuel remaining in the electric vehicle, and adding the fuel-based range to the estimated range of the electric vehicle as a total range of the electric vehicle.

In yet another embodiment, one or more computer-readable media having computer-executable instructions embodied thereon are provided. The computer-executable instructions are configured to cause at least one processor, upon being executed by the at least one processor, to perform a method of performing an automated range estimation process for an electric vehicle. The method includes estimating, using the at least one processor, an initial value of an energy required to travel a unit distance for the electric vehicle, generating, using the at least one processor, a first estimation model based on a correlation between a maximum all-electric-range and the energy required to travel a unit distance for the electric vehicle, adjusting, using the at least one processor, the first estimation model based on one or more predetermined driving conditions, updating, using the at least one processor, the maximum all-electric-range of the electric vehicle based on the adjusted first estimation model, calculating, using the at least one processor, an estimated range of the electric vehicle based on the updated maximum all-electric-range of the electric vehicle and a fraction of total energy capability remaining in the electric vehicle, and outputting, using the at least one processor, the estimated range of the electric vehicle. The method further includes controlling, using the at least one processor, the electric vehicle using the outputted estimated range.

In one example, the at least one processor is further configured to determine whether the electric vehicle is at least partially powered by an engine. In a variation, the at least one processor is further configured to retrieve an initial value of average fuel economy information for the electric vehicle. In a further variation, the at least one processor is further configured to generate a second estimation model based on a correlation between the average fuel economy information and the energy required to travel the unit distance for the electric vehicle. In another variation, the at least one processor is further configured to adjust the second estimation model based on the one or more predetermined driving conditions. In yet another variation, the at least one processor is further configured to update the average fuel economy information of the electric vehicle based on the adjusted second estimation model, and calculate the estimated rage of the electric vehicle based on the updated maximum all-electric-range of the electric vehicle, the fraction of total energy capability remaining in the electric vehicle, the updated average fuel economy information of the electric vehicle, and an amount of fuel remaining in the electric vehicle.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The embodiment disclosed below is not intended to be exhaustive or limit the disclosure to the precise form disclosed in the following detailed description. Rather, the embodiment is chosen and described so that others skilled in the art may utilize its teachings. One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Figure 1:
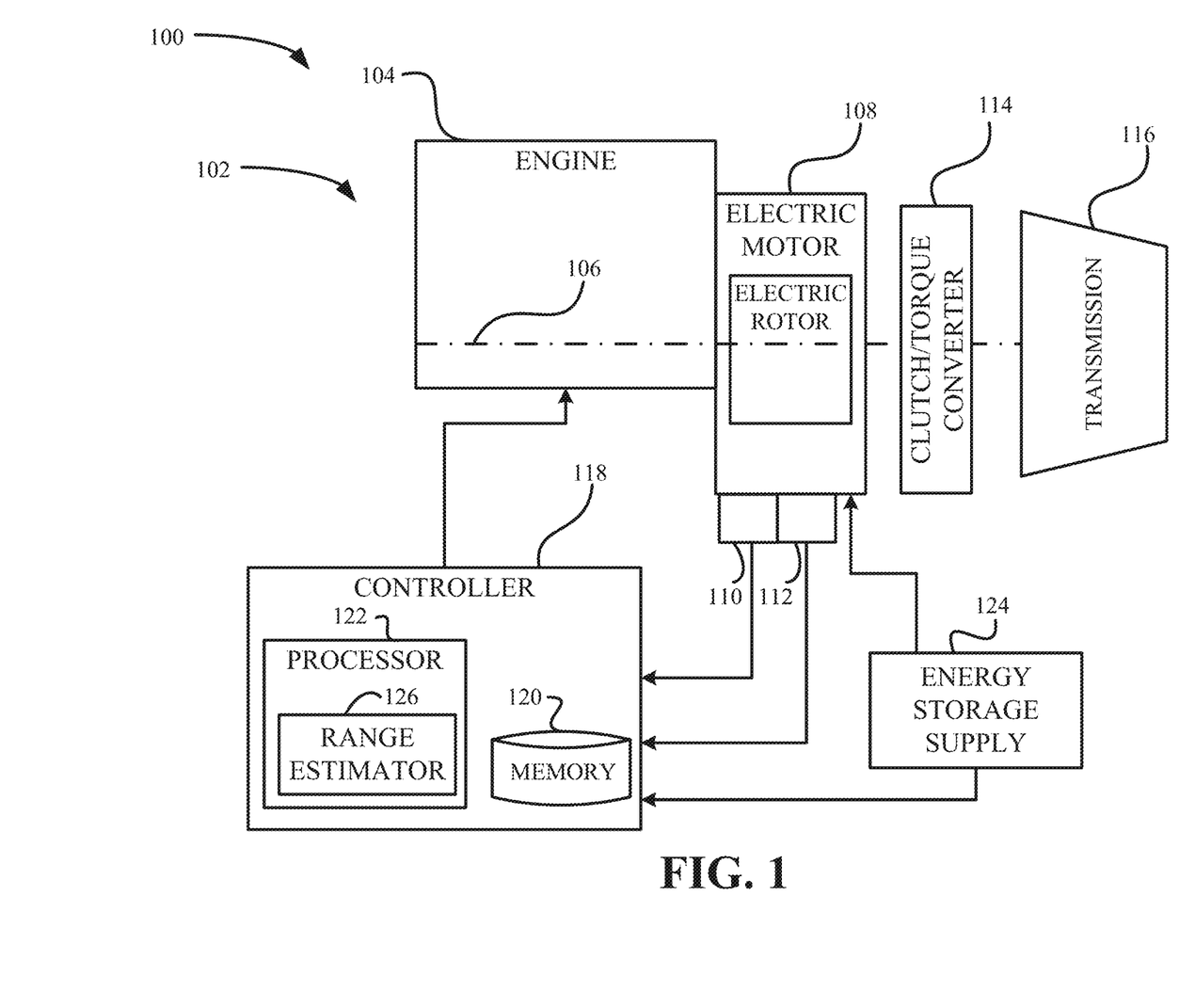
FIG. 1 is a schematic diagram of an engine and electric motor system featuring a range estimator for an electric vehicle in accordance with embodiments of the present disclosure.

Referring now to FIG. 1, a hybrid system 100 for an electric vehicle 102 is illustrated. Although electric vehicle 102 with an internal combustion engine 104 is shown, the present disclosure can be applied to a pure electric vehicle powered by only batteries without engine 104. In various embodiments, the present disclosure is applicable to a series range extender, a parallel configuration architecture, and a pure electric architecture. In this example, system 100 can include internal combustion engine 104 having a crankshaft 106 and a crankshaft sprocket (not shown) coupled to the crankshaft. Engine 104 is not particularly limited and can be any type of reciprocating engine, such as a diesel engine or a gasoline engine.

System 100 can also include an electric motor 108 in mechanical communication with the crankshaft sprocket. For example, electric motor 108 can be a traction motor used for propulsion of electric vehicle 102. In various embodiments, electric motor 108 can be coupled to a speed sensor 110, a torque sensor 112, engine 104, a clutch or torque converter 114, and a transmission 116 via crankshaft 106. In various embodiments, speed sensor 110 and electric motor 108 are in mechanical and electrical communication with crankshaft 106. For example, by being in mechanical communication, a relative position can be maintained and operational control of engine 104 can continue. Also, electric motor 108 is not particularly limited and, for example, can be a motor/generator, synchronous motor, or an induction motor.

In embodiments, system 100 also includes a controller 118 in electrical communication with speed sensor 110 and torque sensor 112 and can include a non-transitory memory 120 having instructions that, in response to execution by a processor 122, cause processor 122 to determine a speed or torque value of electric motor 108. As another example, electric motor 108 electrically receives power from a rechargeable energy storage supply 124, such as a battery pack, and energy storage supply 124 can provide data representative of state-of-charge (SOC) information to controller 118. Processor 122, non-transitory memory 120, and controller 118 are not particularly limited and can, for example, be physically separate.

In certain embodiments, controller 118 can form a portion of a processing subsystem including one or more computing devices having memory, processing, and communication hardware. Controller 118 can be a single device or a distributed device, and functions of controller 118 can be performed by hardware and/or as computer instructions on a non-transient computer readable storage medium, such as non-transitory memory 120.

In certain embodiments, controller 118 includes one or more interpreters, determiners, evaluators, regulators, and/or processors 122 that functionally execute the operations of controller 118. The description herein including interpreters, determiners, evaluators, regulators, and/or processor emphasizes the structural independence of certain aspects of controller 118 and illustrates one grouping of operations and responsibilities of controller 118. Other groupings that execute similar overall operations are understood within the scope of the present disclosure. Interpreters, determiners, evaluators, regulators, and processors can be implemented in hardware and/or as computer instructions on a non-transient computer readable storage medium, and can be distributed across various hardware or computer-based components.

Example and non-limiting implementation elements that functionally execute the operations of controller 118 include sensors, such as speed sensor 110 and torque sensor 112, providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hardwired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In the illustrated embodiment, processor 122 includes a range estimator 126 configured to perform a range estimation of electric vehicle 102 based on a maximum all-electric-range $AER_{MAX}$ and a fraction of total energy capability remaining $SOC_{FRAC}$ for electric vehicle 102. For example, the maximum all-electric-range $AER_{MAX}$ can be a maximum value of driving range for electric vehicle 102 when energy storage supply 124 is fully charged (e.g., $AER_{MAX}$=100 miles for a battery having 100% SOC). As another example, the fraction of total energy capability remaining $SOC_{FRAC}$ can be a fractional value of total usable battery capacity currently remaining in energy storage supply 124 (e.g., $SOC_{FRAC}$=0.9 when 90% SOC). Although imperial units are shown for illustration purposes, other measuring units, such as metric units, are also contemplated to suit different applications.

In FIG. 1, since system 100 includes engine 104, range estimator 126 calculates an estimated range ER of electric vehicle 102 based on the maximum all-electric-range $AER_{MAX}$, the fraction of total energy capability remaining $SOC_{FRAC}$, and a miles-per-gallon (MPG) associated with electric vehicle 102. In this configuration, an exemplary estimated range ER can be determined as defined in expression (1) below.

$$ER=(AER_{MAX}*SOC_{FRAC})+(MPG_{AVG}*Fuel_{Remaining}) \quad (1)$$

wherein $AER_{MAX}$ refers to a maximum all-electric-range for electric vehicle 102 determined based on an energy per mile (EPM), $SOC_{FRAC}$ refers to a fraction of total energy capability remaining in energy storage supply 124 of electric vehicle 102, $MPG_{AVG}$ refers to average fuel economy information (e.g., miles-per-gallon) for electric vehicle 102 determined during a predetermined period, and $Fuel_{Remaining}$ refers to an amount of fuel (e.g., diesel or gasoline) remaining in electric vehicle 102.

Initially, values of $AER_{MAX}$ and/or $MPG_{AVG}$ can be retrieved from a look-up table or an empirical model stored in memory 120. For example, the look-up table or the empirical model having default values can be provided by a manufacturer of electric vehicle 102. As another example, range estimator 126 can generate and/or update the look-up table or the empirical model as electric vehicle 102 accumulates data relating to the values of $AER_{MAX}$ and/or $MPG_{AVG}$.

In one embodiment, the look-up table can provide the maximum value of driving range for electric vehicle 102 when energy storage supply 124 is fully charged. In another example, the empirical model generated based on historical or simulation data relating to a mileage of electric vehicle 102 can be used to initially set the values of $AER_{MAX}$ and/or $MPG_{AVG}$. Such initial values of $AER_{MAX}$ and/or $MPG_{AVG}$ can be retrieved from the look-up table from a previous mission for electric vehicle 102 and updated as a current mission for electric vehicle 102 proceeds. A mission refers to a work project or assignment performed by electric vehicle 102, such as a scheduled delivery or a specified task.

In another embodiment, the values of $AER_{MAX}$ and/or $MPG_{AVG}$ can be retrieved from memory 120 having data generated during a previous drive cycle of electric vehicle 102. For example, range estimator 126 stores the values of $AER_{MAX}$ and/or $MPG_{AVG}$ in memory 120 for subsequent retrieval by controller 118 or any other systems related to electric vehicle 102. A drive cycle of electric vehicle 102 refers to a predetermined period during which data relating to electric vehicle 102 is collected under a predetermined driving condition. For example, the drive cycle can be a time duration during which data relating to electric vehicle 102 are collected when electric vehicle 102 is driven under various speed or torque conditions.

It is advantageous that at least one of $AER_{MAX}$ and $MPG_{AVG}$ can be adjusted based on the energy-per-mile (EPM) associated with electric vehicle 102. In embodiments, EPM refers an energy required to travel a unit distance under one or more predetermined driving conditions. An exemplary unit of EPM can be a kilowatt hour per mile (Kwh/Mile) or a joule per mile (J/Mile). Typically, $AER_{MAX}$ and $MPG_{AVG}$ has an inverse relationship with EPM. Thus, for example, the higher the value of EPM is, the lower the value of $AER_{MAX}$ becomes. Similarly, the higher the value of EPM is, the lower the value of $MPG_{AVG}$ becomes. Detailed description of such inverse relationship is provided below in paragraphs relating to FIGS. 2 and 3.

An exemplary predetermined driving conditions can include at least one of: a health condition (e.g., a state of health of battery), a road condition (e.g., flat road versus inclined hill), a load condition (e.g., torque), a weather condition (e.g., ambient temperature), a temperature condition (e.g., battery or coolant temperature), a charge condition (e.g., battery SOC), and the like. Other driving conditions that can affect the driving range of electric vehicle 102 are also contemplated to suit different applications. Examples of such conditions further include tire pressures and type, vehicle or cargo or passenger weights and multiple vehicle set-ups (e.g., battery size or capacity, battery type, engine size, transmission type/calibration, aerodynamics, accessory electric loads, air conditioning/heating settings or the like).

Figure 2:
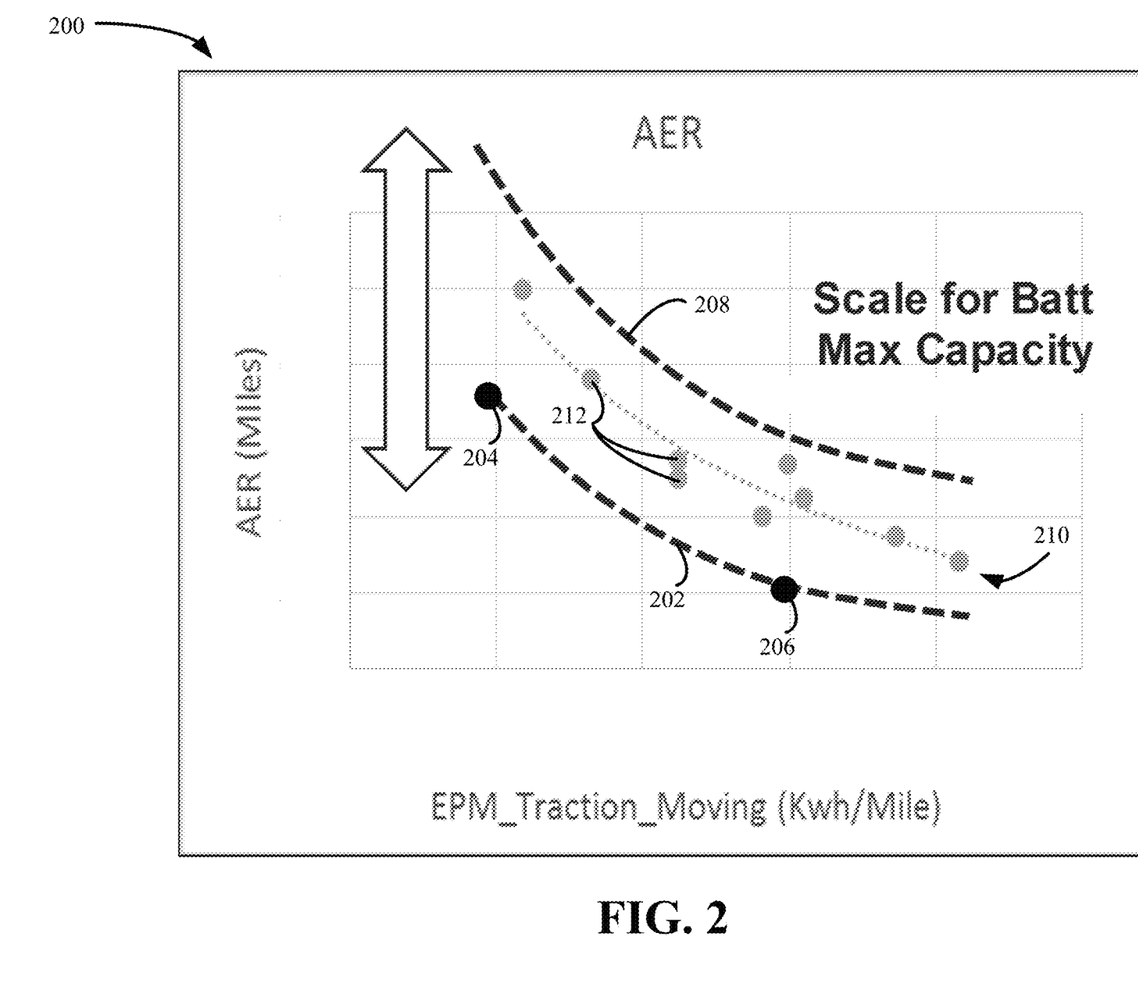
FIG. 2 is a graphical presentation of performing a range estimation with respect to an all-electric-range using the range estimator shown in FIG. 1.

Referring now to FIG. 2, a graphical presentation 200 of performing the range estimation is shown for electric vehicle 102 with respect to $AER_{MAX}$ using range estimator 126. Units shown in x- and y-axis can represent normalized values between zero and one, or the units can include any suitable numbers. In one embodiment, range estimator 126 is configured to generate an estimation model based on a correlation between $AER_{MAX}$ and EPM for electric vehicle 102. For example, range estimator 126 receives or retrieves the initial value of $AER_{MAX}$ from the look-up table in memory 120. Then, range estimator 126 generates the estimation model having correlation information representative of an inverse relationship between $AER_{MAX}$ and EPM (e.g., graphical representation 200). An exemplary $AER_{MAX}$ can be determined as a function of EPM as defined in expression (2) below.

$$AER_{MAX}=f(EPM) \qquad (2)$$

wherein $AER_{MAX}$ refers to a maximum all-electric-range for electric vehicle 102 determined based on an energy per mile (EPM), and EPM refers an energy required to travel a unit distance under one or more predetermined driving conditions, representing an inverse relationship between $AER_{MAX}$ and EPM.

Further, range estimator 126 is configured to automatically adjust the estimation model based on the one or more predetermined driving conditions. For example, range estimator 126 is configured to apply a scalar or non-linear correction method for updating the estimation model based on the one or more predetermined driving conditions. Other suitable error detection and correction methods are also contemplated to suit the application. In another embodiment, range estimator 126 is configured to apply a machine learning technique for correcting the estimation model of a current drive cycle based on historical, empirical, or simulation data relating to one or more previous drive cycles of electric vehicle 102.

More specifically, as shown in FIG. 2, a graph segment 202 represents the estimation model having the inverse relationship between $AER_{MAX}$ and EPM when energy storage supply 124 has a first capacity (e.g., a maximum rechargeable capacity of a smaller battery). In this embodiment, graph segment 202 illustrates that $AER_{MAX}$ decreases as EPM increases from a data point 204 to a data point 206. For example, when EPM is set at 1.00 Kwh/Mile, $AER_{MAX}$ is set at 55 miles, but when EPM is set at 2.00 Kwh/Mile, $AER_{MAX}$ is set at 30 miles.

Such a variance between data points 204 and 206 can be due to the one or more predetermined driving conditions. For example, electric vehicle 102 operating at data point 206 requires more EPM due to an increased load condition (e.g., a heavier load), thereby lowering the value of $AER_{MAX}$. In contrast, electric vehicle 102 operating at data point 204 requires less EPM due to a decreased load condition (e.g., a lighter load), thereby raising the value of $AER_{MAX}$. Thus, it is advantageous that range estimator 126 automatically adjusts the values of $AER_{MAX}$ based on the values of EPM at different driving conditions.

As another example, range estimator 126 is configured to automatically adjust the estimation model based on a battery size or capacity. In FIG. 2, a graph segment 208 represents the estimation model having the inverse relationship between $AER_{MAX}$ and EPM when energy storage supply 124 has a second capacity (e.g., a maximum rechargeable capacity of a larger battery). In this embodiment, graph segment 208 illustrates that the battery size of graph segment 208 is greater than the one of graph segment 202. It is advantageous that range estimator 126 automatically updates the values of $AER_{MAX}$ based on the adjusted estimation model, e.g., the EPM adjusted based on the battery size or capacity, such that the estimation model is calibrated accordingly. As a result, the estimation model is readily scalable for a battery maximum capacity of energy storage supply 124. As such, the values relating to data points 204 and 206 are automatically updated for graph segment 208 based on a slope or curvature of graph segment 202.

In embodiments, range estimator 126 stores the values of $AER_{MAX}$ and EPM and corresponding driving conditions for electric vehicle 102 in memory 120 as a form of the look-up table for subsequent retrieval. Also, range estimator 126 is configured to store the estimation model in memory 120 and automatically update the estimation model periodically, e.g., after a predetermined period following an engine start-up. As such, the slope or curvature of graph segments 202 and/or 208 can be subsequently changed based on the update of the estimation model.

In another embodiment, in lieu of or in combination with the look-up table, an empirical model 210 generated based on historical or simulation data 212 relating to a mileage of electric vehicle 102 can be used to initially set the values of $AER_{MAX}$ and/or $MPG_{AVG}$. Further, empirical model 210 of a current drive cycle can be periodically adjusted or updated by range estimator 126 based on the one or more previous drive cycles of electric vehicle 102. As with graph segments 202 and 208, empirical model 210 also represents the estimation model having the inverse relationship between $AER_{MAX}$ and EPM. The estimation model represented by empirical model 210 can be automatically adjusted by range estimator 126 based on the one or more predetermined driving conditions. As such, the slope or curvature of graph segments 202 and/or 208 can be subsequently changed based on the adjustment of empirical model 210.

Figure 3:
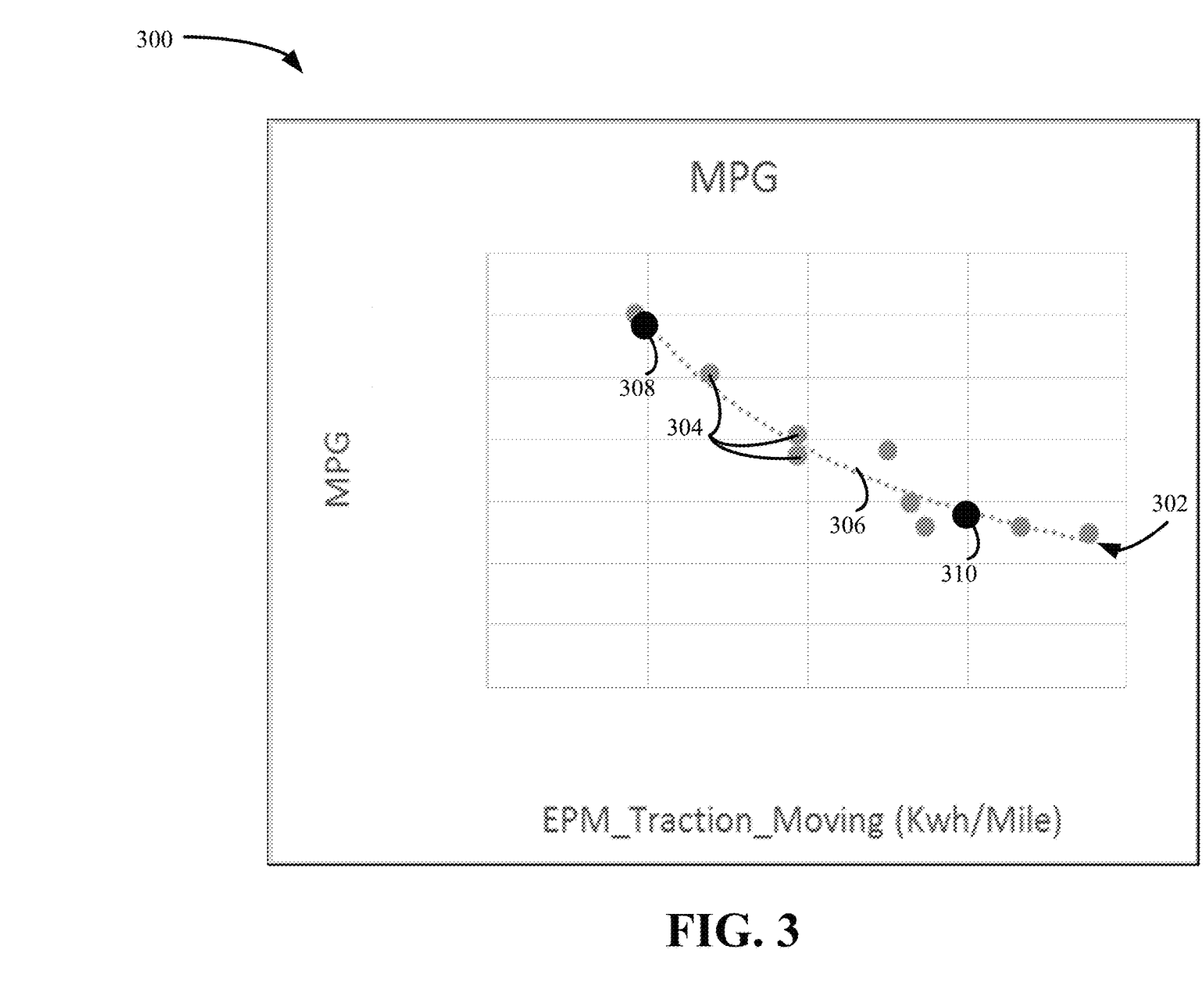
FIG. 3 a graphical presentation of performing the range estimation with respect to a miles-per-gallon using the range estimator shown in FIG. 1.

Referring now to FIG. 3, a graphical presentation 300 of performing the range estimation is shown for electric vehicle 102 with respect to $MPG_{AVG}$ using range estimator 126. Units shown in x- and y-axis can represent normalized values between zero and one, or the units can include any suitable numbers. In one embodiment, range estimator 126 is configured to generate the estimation model based on a correlation between $MPG_{AVG}$ and EPM for electric vehicle 102. For example, range estimator 126 receives or retrieves the initial value of $MPG_{AVG}$ from the look-up table or an empirical model 302 generated based on historical or simulation data 304 relating to a mileage of electric vehicle 102. Although only empirical model 302 is shown for illustration purposes, the estimation model can also be generated based on the correlation between $MPG_{AVG}$ and EPM using the look-up table stored in memory 120. As such, similar graph segments 202 and 208 shown in FIG. 2 can also be used to automatically adjust the estimation model as discussed above.

In FIG. 3, range estimator 126 receives or retrieves the initial value of $MPG_{AVG}$ from empirical model 302. Then, range estimator 126 generates the estimation model having correlation information representative of an inverse relationship between $MPG_{AVG}$ and EPM (e.g., graphical representation 300). An exemplary $MPG_{AVG}$ can be determined as a function of EPM as defined in expression (3) below.

$$MPG_{AVG} = f(EPM) \quad (3)$$

wherein $MPG_{AVG}$ refers to an average miles-per-gallon for electric vehicle 102 determined during a predetermined period based on an energy per mile (EPM), and EPM refers an energy required to travel a unit distance under one or more predetermined driving conditions, representing an inverse relationship between $MPG_{AVG}$ and EPM.

In FIG. 3, a graph segment 306 represents the estimation model having the inverse relationship between $MPG_{AVG}$ and EPM when a current fuel amount of electric vehicle 102 is greater than zero. In one embodiment, $MPG_{AVG}$ is determined irrespective of receiving power from energy storage supply 124. In this embodiment, graph segment 306 illustrates that $MPG_{AVG}$ decreases as EPM increases from a data point 308 to a data point 310. For example, when EPM is set at 1.00 Kwh/Mile, $MPG_{AVG}$ is set at 12 miles-per-gallon, but when EPM is set at 2.00 Kwh/Mile, $MPG_{AVG}$ is set at 6 miles-per-gallon.

As similarly shown in FIG. 2, such a variance between data points 308 and 310 can be due to the one or more predetermined driving conditions. For example, electric vehicle 102 operating at data point 310 requires more EPM due to an increased load condition (e.g., a heavier load), thereby lowering the value of $MPG_{AVG}$. In contrast, electric vehicle 102 operating at data point 308 requires less EPM due to a decreased load condition (e.g., a lighter load), thereby raising the value of $MPG_{AVG}$. Thus, it is advantageous that range estimator 126 automatically updates the values of $MPG_{AVG}$ based on the adjusted estimation model, e.g., the values of EPM adjusted at different driving conditions.

In embodiments, range estimator 126 stores the values of $MPG_{AVG}$ and EPM and corresponding driving conditions for electric vehicle 102 in memory 120 as a form of the look-up table for subsequent retrieval. Also, range estimator 126 is configured to store the estimation model in memory 120 and automatically update the estimation model periodically, e.g., after a predetermined period following an engine start-up. As such, the slope or curvature of graph segment 306 can be subsequently changed based on the update of the estimation model.

In one embodiment, empirical model 302 generated based on historical or simulation data 304 can be used to initially set the values of $AER_{MAX}$ and/or $MPG_{AVG}$. Further, empirical model 302 of a current drive cycle can be periodically adjusted or updated by range estimator 126 based on the one or more previous drive cycles of electric vehicle 102. Further, empirical model 302 also represents the estimation model having the inverse relationship between $MPG_{AVG}$ and EPM. The estimation model represented by empirical model 302 can be automatically adjusted by range estimator 126 based on the one or more predetermined driving conditions. As such, the slope or curvature of graph segment 306 can be subsequently changed based on the adjustment of empirical model 302.

In another embodiment, when the value of $MPG_{AVG}$ is determined by range estimator 126 for a current mission for electric vehicle 102, range estimator 126 can automatically stop the adjustment of estimation model represented by empirical model 302. Further, since the value of $MPG_{AVG}$ advantageously reflects an effect of EPM changes based on the one or more predetermined driving conditions, range estimator 126 can cause other control systems of electric vehicle 102, such a fuel injection control system, to perform an adequate fueling compensation process based on the estimation model. Techniques and methods described above regarding FIGS. 2 and 3 can be at least partially or in combination applied to and utilized for calculating the estimated range ER shown in expression (1).

Figure 4:
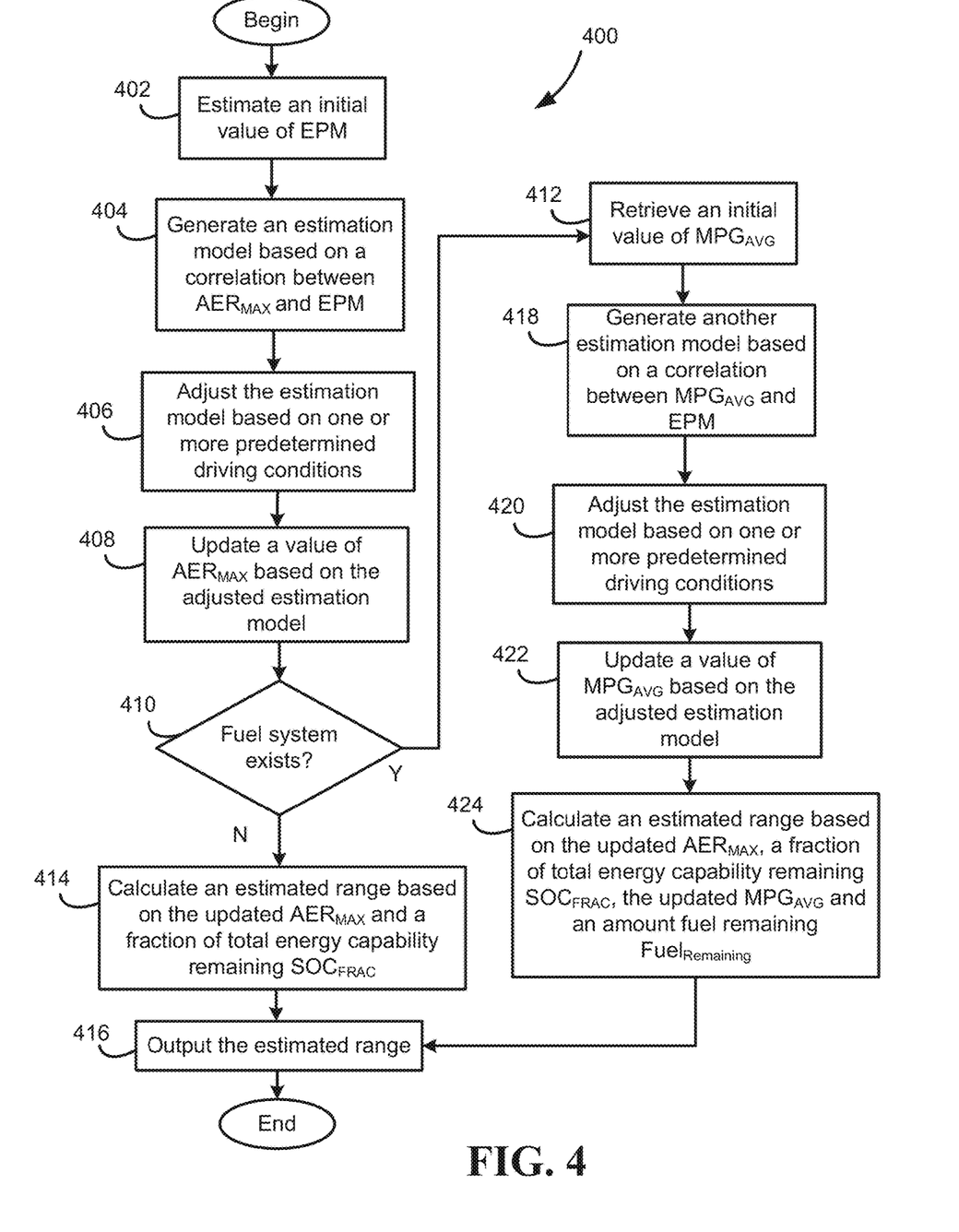
FIG. 4 is a flowchart of a method of performing the range estimation for the electric vehicle in accordance with embodiments of the present disclosure.

Referring now to FIG. 4, an illustrative range estimation process is shown for electric vehicle 102 in accordance with embodiments of the subject matter disclosed herein. As disclosed herein, system 100 is not particularly limited and can perform any of the methods described within the scope of this disclosure. In FIG. 4, a method 400 of performing the automated range estimation process is shown using range estimator 126.

At block 402, range estimator 126 retrieves or estimates an initial value of EPM for electric vehicle 102 and the EPM value is fed to a model, a look-up table, or an empirical function to estimate an initial value of $AER_{MAX}$ for electric vehicle 102. For example, the initial value of $AER_{MAX}$ can be estimated from the look-up table or the empirical model stored in memory 120. In one example, the values stored in the look-up table or the empirical model can be set as default values by the manufacturer of electric vehicle 102. In another example, the values stored in the look-up table or the empirical model can be set during a previous mission performed by electric vehicle 102. In yet another example, the values can be entered into system 100 using a user input device, such as a keyboard or a mouse. In still another example, the values can be fed into blocks 404, 406, and 408.

At block 404, range estimator 126 generates an estimation model based on a correlation between $AER_{MAX}$ and EPM for electric vehicle 102. As shown in FIG. 2, range estimator 126 generates the estimation model having correlation information representative of an inverse relationship between $AER_{MAX}$ and EPM.

At block 406, range estimator 126 adjusts the estimation model based on one or more predetermined driving conditions. As discussed above, range estimator 126 automatically applies a scalar or non-linear correction method for updating the estimation model based on the one or more predetermined driving conditions. In another embodiment, an accuracy of the estimation model or look-up tables can be enhanced using real-time online data monitoring. Further, it is not necessary that the empirical model or look-up-table used here is necessarily correct for the battery chemistry or engine efficiency. The accuracy can change as components degrade or due to external influences. For example, when an aftermarket accessory is added to electric vehicle 102, it can consume more energy than expected and not accounted in the EPM calculations. Historical information of how $AER_{MAX}$ is corresponding to certain EPMs with actual values over few cycles can be stored in memory 120. Then, a correction or adjustment function can be applied either offline via Telematics or online in controller 118.

At block 408, range estimator 126 updates the value of $AER_{MAX}$ based on the adjusted estimation model. For example, the value of $AER_{MAX}$ is updated based on the EPM adjusted based on the battery size or capacity, or the load condition of electric vehicle 102.

At block 410, range estimator 126 determines whether electric vehicle 102 is at least partially powered by engine 104. When electric vehicle 102 is powered by engine 104, control proceeds to block 412. Otherwise, control proceeds to block 414. For example, range estimator 126 detects a fuel system associated with electric vehicle 102 via sensors associated with the fuel system, e.g., a fuel level sensor.

At block 414, range estimator 126 calculates an estimated range ER of electric vehicle 102 based on the updated $AER_{MAX}$ and a fraction of total energy capability remaining $SOC_{FRAC}$. For example, the estimated range ER can be calculated by multiplying the value of $AER_{MAX}$ by the value of $SOC_{FRAC}$ as shown in expression (1) above.

At block 416, range estimator 126 outputs the estimated range ER of electric vehicle 102 for display or further processing. For example, the estimated range ER can be displayed on a dashboard of electric vehicle 102, or can be transmitted to other control systems of electric vehicle 102, such as an alert or warning system, or a fuel control system for further processing. In embodiments, the outputted estimated range ER of electric vehicle 102 is used to control electric vehicle 102. In one example, a control alert can be issued to recharge energy storage supply 124 (e.g., the battery) based on the outputted estimated range ER. In another example, another control alert can be issued to fill a fuel tank of a hybrid vehicle.

Other exemplary practical uses of the estimated range ER include: if a navigation mission route is provided with a distance to travel target, then the estimated range ER can optimize the state of charge target trajectory to ensure that the vehicle can go either only in a pure electric vehicle mode or a range extender mode depending on a mission distance provided by a navigation system. The estimated range ER can further reduce the fuel consumption and also reduce emissions substantially. For example, for mission distances longer than a pure electric vehicle capability, the estimated range ER can optimize the state of charge target and when to stop/start the engine for the best fuel efficiency and lower the emissions reduction.

In another example, the estimated range ER can also act as a diagnostic tool if a fuel gauge on the vehicle for both SOC and/or a fuel level is malfunctioning (but the SOC and fuel level sensors are working fine), then the estimated range ER can correct the fuel gauge reading or help a driver understand that the fuel gauge is broken, but the level sensor is not malfunctioning.

In yet another example, the estimated range ER can be used to inform the driver for recommended overnight recharging levels. For example, if the driver is always driving more distance than his available or actual AER which can be consistently low because the driver is not charging the battery appropriately overnight. Thus, due to his regular missions, the engine now needs to support battery charging and longer mission distances. At this stage, the estimated range ER can be used to monitor the starting SOC levels, total mission distance usually driven and inform the driver or other systems to charge the battery overnight more so that the future missions can possibly be run in a pure electric vehicle mode or continue the engine operation to get fuel efficiency benefit and lower emissions.

At block 412, range estimator 126 retrieves an initial value of $MPG_{AVG}$ for electric vehicle 102. As discussed above, the initial value of $MPG_{AVG}$ can be retrieved from the look-up table or the empirical model stored in memory 120. In one example, the values stored in the look-up table or the empirical model can be set as default values by the manufacturer of electric vehicle 102. In another example, the values stored in the look-up table or the empirical model can be set during a previous mission performed by electric vehicle 102. In yet another example, the values can be entered into system 100 using a user input device, such as a keyboard or a mouse. In still another example, the values can be fed into blocks 418, 420, and 422.

At block 418, range estimator 126 generates another estimation model based on a correlation between $MPG_{AVG}$ and EPM for electric vehicle 102. As shown in FIG. 3, range estimator 126 generates the estimation model having correlation information representative of an inverse relationship between $MPG_{AVG}$ and EPM. In another embodiment, in lieu of the estimation model, range estimator 126 can use online fueling measurement and distance calculation to calculate MPG values.

At block 420, range estimator 126 adjusts the estimation model generated in block 418 based on one or more predetermined driving conditions. As discussed above, range estimator 126 automatically applies a scalar or non-linear correction method for updating the estimation model based on the one or more predetermined driving conditions.

At block 422, range estimator 126 updates the value of $MPG_{AVG}$ based on the adjusted estimation model. For example, the value of $MPG_{AVG}$ is updated based on the EPM adjusted at different driving conditions (e.g., a lighter load versus a heavier load for electric vehicle 102).

At block 424, range estimator 126 calculates an estimated range ER of electric vehicle 102 based on the updated $AER_{MAX}$ and the fraction of total energy capability remaining $SOC_{FRAC}$, and the updated $MPG_{AVG}$ and an amount of fuel remaining $Fuel_{Remaining}$ in electric vehicle 102. For example, the estimated range ER can be calculated by multiplying the value of $AER_{MAX}$ by the value of $SOC_{FRAC}$, multiplying the value of $MPG_{AVG}$ by the amount of fuel remaining $Fuel_{Remaining}$, and summarizing the multiplied values, as shown in expression (1) above.

It should be understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

What is claimed is:

1. A computer-implemented method of performing an automated range estimation process for an electric vehicle using a processor, the method comprising: retrieving, using the processor, an initial value of an energy required to travel a unit distance for the electric vehicle, wherein the initial value is provided by a manufacturer of the electric vehicle; generating, using the processor, a first estimation model based on a correlation between a maximum all-electric-range and the energy required to travel a unit distance for the electric vehicle, the maximum all-electric-range defined as a maximum driving range based on the initial value of the energy required to travel a unit distance for the electric vehicle when an energy supply of the electric vehicle is at 100% state of charge as initially determined, and the energy required to travel a unit distance being calibratable based on a a maximum rechargeable capacity of the energy supply; adjusting, using the processor, the first estimation model based on one or more predetermined driving conditions; updating, using the processor, the maximum all-electric-range of the electric vehicle based on the adjusted first estimation model; calculating, using the processor, an estimated range of the electric vehicle based on the updated maximum all-electric-range of the electric vehicle and a fraction of total energy capability remaining in the energy supply of the electric vehicle; outputting, using the processor, the estimated range of the electric vehicle; and controlling, using the processor, the electric vehicle using the outputted estimated range.

2. The method of claim 1, further comprising determining whether the electric vehicle is at least partially powered by an engine.

3. The method of claim 2, wherein determining whether the electric vehicle is at least partially powered by the engine comprises retrieving an initial value of average fuel economy information for the electric vehicle.

4. The method of claim 3, further comprising generating a second estimation model based on a correlation between the average fuel economy information and the energy required to travel the unit distance for the electric vehicle.

5. The method of claim 4, further comprising adjusting the second estimation model based on the one or more predetermined driving conditions.

6. The method of claim 5, further comprising updating the average fuel economy information of the electric vehicle based on the adjusted second estimation model.

7. The method of claim 6, further comprising calculating the estimated range of the electric vehicle based on the updated maximum all-electric-range of the electric vehicle, the fraction of total energy capability remaining in the energy supply of the electric vehicle, the updated average fuel economy information of the electric vehicle, and an amount of fuel remaining in the electric vehicle.

8. The method of claim 3, further comprising calculating a fuel-based range of the electric vehicle based on the average fuel economy information and an amount of fuel remaining in the electric vehicle, and adding the fuel-based range to the estimated range of the electric vehicle as a total range of the electric vehicle.

9. A system for performing an automated range estimation process for an electric vehicle using a processor, comprising: a range estimator configured to: retrieve an initial value of an energy required to travel a unit distance for the electric vehicle that is either provided by a manufacturer of the electric vehicle; generate a first estimation model based on a correlation between a maximum all-electric-range and the energy required to travel a unit distance for the electric vehicle, the maximum all-electric-range defined as a maximum driving range based on the initial value of the energy required to travel a unit distance for the electric vehicle when an energy supply of the electric vehicle is at 100% state of charge as initially determined, and the energy required to travel a unit distance being calibratable based on a a maximum rechargeable capacity of the energy supply; adjust the first estimation model based on one or more predetermined driving conditions: update the maximum all-electric-range of the electric vehicle based on the adjusted first estimation model; calculate an estimated range of the electric vehicle based on the updated maximum all-electric-range of the electric vehicle and a fraction of total energy capability remaining in the energy supply of the electric vehicle; output the estimated range of the electric vehicle; and control the electric vehicle using the outputted estimated range.

10. The system of claim 9, wherein the range estimator is further configured to determine whether the electric vehicle is at least partially powered by an engine.

11. The system of claim 10, wherein the range estimator is further configured to retrieve an initial value of average fuel economy information for the electric vehicle.

12. The system of claim 11, wherein the range estimator is further configured to generate a second estimation model based on a correlation between the average fuel economy information and the energy required to travel the unit distance for the electric vehicle.

13. The system of claim 12, wherein the range estimator is further configured to adjust the second estimation model based on the one or more predetermined driving conditions.

14. The system of claim 13, wherein the range estimator is further configured to update the average fuel economy information of the electric vehicle based on the adjusted second estimation model.

15. The system of claim 14, wherein the range estimator is further configured to calculate the estimated range of the electric vehicle based on the updated maximum all-electric-range of the electric vehicle, the fraction of total energy capability remaining in the electric vehicle, the updated average fuel economy information of the electric vehicle, and an, amount of fuel remaining in the electric vehicle.

16. The system of claim 11, wherein the range estimator is further configured to calculate a fuel-based range of the electric vehicle based on the average fuel economy information and an amount of fuel remaining in the electric vehicle, and adding the fuel-based range to the estimated range of the electric vehicle as a total range of the electric vehicle.

17. One or more non-transitory computer-readable media having computer-executable instructions embodied thereon, the computer-executable instructions configured to cause at least one processor, upon being executed by the at least one processor, to perform a method of performing an automated range estimation process for an electric vehicle, the method comprising: retrieving, using the at least one processor, an initial value of an energy required to travel a unit distance for the electric vehicle that is either provided by a manufacturer of the electric vehicle; generating, using the at least one processor, a first estimation model based on a correlation between a maximum all-electric-range and the energy required to travel a unit distance for the electric vehicle, the maximum all-electric-range defined as a maximum driving range based on the initial value of the energy required to travel a unit distance for the electric vehicle when an energy supply of the electric vehicle is at 100% state of charge as initially determined, and the energy required to travel a unit distance being calibratable based on a a maximum rechargeable capacity of the energy supply; adjusting, using the at least one processor, the first estimation model based on one or more predetermined driving conditions; updating, using the at least one processor, the maximum all-electric-range of the electric vehicle based on the adjusted first estimation model; calculating, using the at least one processor, an estimated range of the electric vehicle based on the updated maximum all-electric-range of the electric vehicle and a fraction of total energy capability remaining in the energy supply of the electric vehicle; and outputting, using the at least one processor, the estimated range of the electric vehicle; and controlling, using the at least one processor, the electric vehicle using the outputted estimated range.

18. The non-transitory media of claim 17, wherein the at least one processor is further configured to determine whether the electric vehicle is at least partially powered by an engine.

19. The non-transitory media of claim 18, wherein the at least one processor is further configured to retrieve an initial value of average fuel economy information for the electric vehicle.

20. The non-transitory media of claim 19, wherein the at least one processor is further configured to generate a second estimation model based on a correlation between the average fuel economy information and the energy required to travel the unit distance for the electric vehicle.

21. The non-transitory media of claim 20, wherein the at least one processor is further configured to adjust the second estimation model based on the one or more predetermined driving conditions.

22. The non-transitory media of claim 21, wherein the at least one processor is further configured to update the average, fuel economy information of the electric vehicle based on the adjusted second estimation model, and calculate the estimated rage of the electric vehicle based on the updated maximum all-electric-range of the electric vehicle, the fraction of total energy capability remaining in the electric vehicle, the updated average fuel economy information of the electric vehicle, and an amount of fuel remaining.in the electric vehicle.

* * * * *